(No Model.)
C. S. HOWE & J. W. LANGLEY.
COMPOSITION FOR REPAIRING LEAKS IN PNEUMATIC TIRES.
No. 575,648. Patented Jan. 19, 1897.
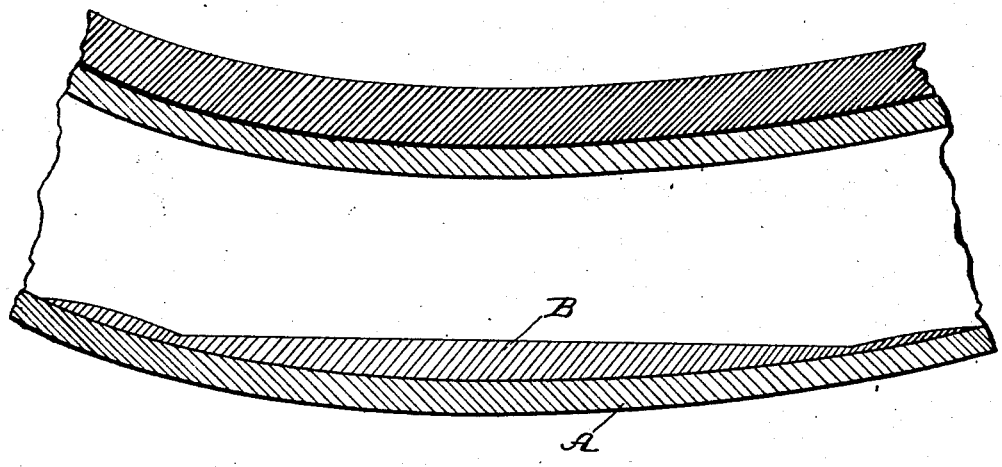

UNITED STATES PATENT OFFICE.

CHARLES S. HOWE AND JOHN W. LANGLEY, OF CLEVELAND, OHIO.

COMPOSITION FOR REPAIRING LEAKS IN PNEUMATIC TIRES.

SPECIFICATION forming part of Letters Patent No. 575,648, dated January 19, 1897.

Application filed May 19, 1896. Serial No. 592,233. (No specimens.)

*To all whom it may concern:*

Be it known that we, CHARLES S. HOWE and JOHN W. LANGLEY, citizens of the United States, residing at Cleveland, in the county of Cuyahoga and State of Ohio, have invented a new and useful Composition of Matter to be Used for Repairing Leaks in Pneumatic Tires for Bicycles or other Vehicles, such as those caused by punctures, cuts, or tears made in the rubber tires by pointed or cutting surfaces with which the tires are liable to come into contact when the vehicle is used in its customary manner, of which the following is a specification.

It is well known that the pneumatic tires are often punctured or cut by coming into contact with sharp cutting-surfaces, such as tacks, nails, or fragments of glass or wire lying in the road over which the vehicle may be passing, and that these punctures or cuts, by allowing the air within the tire to escape, render the tire temporarily useless. Up to the present time the customary method of repairing such injuries as those referred to is by the insertion of plugs or the application of cement, either of which procedures involves a loss of time and a certain degree of skill on the part of the person who is applying them.

Attempts have been made to mend holes in the tire by putting water or oil or other substances into the interior of the tire; but these remedies have not been successful, because the water soon oozes out through the hole, or if oil is used it rapidly softens and ruins the india-rubber of which the tire is made.

The object of our invention is to make a fluid which shall have no injurious effect on the india-rubber of the tire and which shall be capable of filling up any small puncture or cut automatically, thus rendering the tire substantially as capable of holding air as it was before the injury had been received.

The accompanying drawing represents a section of a pneumatic vehicle-tire, illustrating the application of our invention.

The tire is indicated by the reference-letter A, and the liquid is indicated by the letter B and is illustrated as principally collected in the lower portion of the tire and slightly adhering to the interior of the tire forward and back of the lowermost point on account of the thick condition of the composition.

To carry our invention into effect, we prepare a fluid which does not evaporate at ordinary temperatures and which contains within itself in a condition of mechanical suspension a very large number of fine particles of a gelatinous and adhesive quality, so that whenever a puncture or cut occurs in the tire the air in its effort to escape will promptly carry these adhesive particles into the puncture or slit, thus closing it and preventing the further escape of air. In this way a pneumatic tire provided with a small quantity of the above-mentioned fluid in its interior or air-chamber becomes automatically self-repairing and will require very little attention on the part of the user after the tire has once been charged with the fluid.

We find that from four to six ounces of such a fluid is sufficient for each tire, and the material can be put in with a funnel or forced in with a pump.

A composition which fulfils the above requirements is made from glycerin containing gelatinous silica or gelatinous aluminic hydrate in suspension. We have found that one part by volume of commercial liquid water-glass, called also "silicate of soda," mixed with three parts by volume of glycerin and then neutralized by the addition of an acid during constant stirring will make a thick jelly. This jelly is then mixed in a mortar, a churn, or a paint-mill or other similar device with an additional three parts by volume of glycerin, or sometimes for use in cold weather a little water is mixed with the glycerin. Any of the soluble acids may be used, provided that enough acid is employed to render the mixture of water-glass and acid neutral or nearly neutral to test-paper. Hydrochloric acid answers satisfactorily.

To make the aluminous fluid, we take a salt of alumina, such as alum or aluminic sulfate, or of an aluminate of an alkali, such as aluminate of potash or of soda dissolved in water, and mix this solution with three times its volume of glycerin. This mixture is then neutralized by the addition of an alkali for the first two salts named or of an acid, such as hydrochloric or other soluble acid, for the last, and the thick jelly thus formed is ground up and diluted to the consistency of syrup by a further addition of glycerin or of glycerin and water.

The same condition of gelatinous particles in a thick liquid may be secured by substituting for the glycerin water thickened by dextrin or mucilage and having added to it its own weight of chlorid of calcium to prevent evaporation. This liquid is to be used in the same manner as the glycerin for mixing with the water-glass or aluminic salt with subsequent addition of acid. Instead of glycerin or glycerin and water as a vehicle for carrying the gelatinous particles in suspension glycerin and dextrin or mucilage dissolved in water may be used, the said several liquids or liquid mixtures simply serving as vehicles for carrying the gelatinous particles in mechanical suspension. Any liquid which is sufficiently thick, which will not evaporate, and which will not attack or otherwise affect rubber is suitable as such liquid vehicle. These proportions of water-glass, aluminic salts, and glycerin or of water thickened by dextrin have been found to work well in practice, but we do not wish to limit ourselves strictly to the quantities named, for a considerable variation in the volume of glycerin or of water will still furnish a thick liquid containing gelatinous particles in mechanical suspension, which is the substance of our invention.

Other modes of applying the principles of our invention may be employed for the mode herein described. Change may therefore be made as regards the mechanical features of the invention, provided the principles set forth, respectively, in the following claims are employed.

We therefore particularly point out and distinctly claim as our invention—

1. A liquid for repairing leaks in pneumatic vehicle-tires, consisting of a heavy non-oleous liquid containing a mineral gelatinous substance in suspension, substantially as set forth.

2. A liquid for repairing leaks in pneumatic vehicle-tires, consisting of glycerin containing a mineral gelatinous substance in suspension, substantially as set forth.

3. A liquid for repairing leaks in pneumatic vehicle-tires, composed of a heavy non-oleous liquid consisting partly or entirely of glycerin and containing a gelatinous mineral substance in suspension, substantially as set forth.

4. A liquid for repairing leaks in pneumatic vehicle-tires, consisting of a heavy non-oleous liquid containing gelatinous particles of silica in suspension, substantially as set forth.

5. A liquid for repairing leaks in pneumatic vehicle-tires, composed of a heavy non-oleous liquid consisting partly or entirely of glycerin, and containing gelatinous particles of silica in suspension, substantially as set forth.

6. A liquid for repairing leaks in pneumatic vehicle-tires, consisting of glycerin containing gelatinous particles of silica in suspension, substantially as set forth.

7. A liquid for repairing leaks in pneumatic vehicle-tires, consisting of a mixture of glycerin and a solution of water-glass, said mixture being approximately neutralized by an added acid, substantially as set forth.

CHAS. S. HOWE.
JOHN W. LANGLEY.

Witnesses:
F. B. GARRETT,
MILLARD H. NASON.